United States Patent [19]
Felbush

[11] Patent Number: 5,322,399
[45] Date of Patent: Jun. 21, 1994

[54] TUBE END PREPARATION APPARATUS AND METHOD THEREFOR

[75] Inventor: Lyle E. Felbush, Broomfield, Colo.

[73] Assignee: Micro Motion, Incorporated, Boulder, Colo.

[21] Appl. No.: 42,082

[22] Filed: Apr. 1, 1993

[51] Int. Cl.$^5$ ............................................. B23C 3/00
[52] U.S. Cl. ................................... 409/131; 269/909; 279/156; 279/157; 408/1 R; 408/14; 408/103; 408/130; 409/138; 409/225
[58] Field of Search ..................... 408/1 R, 14, 22, 30, 408/103, 104, 107, 130, 186, 187, 188, 189, 200, 203.5, 224; 409/138, 139, 131, 225, 132; 279/46.1, 133, 156, 157; 269/289 R, 909

[56] References Cited

U.S. PATENT DOCUMENTS

| | | | |
|---|---|---|---|
| 1,858,693 | 5/1932 | Van Norman | 279/156 |
| 2,562,455 | 7/1951 | Gridley | 279/157 |
| 2,852,965 | 9/1958 | Wallace | 408/130 |
| 3,122,818 | 3/1964 | Nance | 408/187 |
| 3,516,327 | 6/1970 | Wilson | 408/14 |
| 4,514,121 | 4/1985 | Fuchs, Jr. | 409/138 |
| 5,073,068 | 12/1991 | Jinkins et al. | 408/130 |

FOREIGN PATENT DOCUMENTS

8214  1/1986  Japan ................... 409/138

Primary Examiner—Daniel W. Howell
Attorney, Agent, or Firm—Duft, Graziano & Forest

[57] ABSTRACT

A tube end preparing apparatus for precisely preparing the ends of tubes, including bent tubes. The apparatus includes a reference mechanism, a tube clamping mechanism, a cutting mechanism, and cutting head control mechanisms. The reference mechanism and tube clamping mechanism combine to precisely locate a flow tube with respect to defined reference indicia. The entire locating and clamping process not only provides accuracy and symmetry in aligning and clamping the flow tube relative to the desired reference indicia but can be accurately repeated with speed. The cutting mechanism includes a rotating cutting head mounted for longitudinal movement on a carriage. A control system controls the feeding movement of the carriage as the cutting head nears the end of the flow tube. A first stop mechanism causes a plunger to contact a micro-switch to stop the longitudinal movement of the carriage. A second stop uses a hard stop to prevent the carriage from overtravel due to momentum. A return mechanism returns the carriage to the original operating position after the tube end is precisely prepared. A rotating cutting head mechanism that is adjustable for different tube diameters and bevels and incorporates indexable carbide cutting inserts to provide multiple cutting edges.

37 Claims, 6 Drawing Sheets

TUBE END PREPARATION APPARATUS AND METHOD THEREFOR

FIELD OF THE INVENTION

This invention relates to the field of fabricating the ends of tubes and particularly to the field of precise preparation of tube ends prior to affixation to other structures.

PROBLEM

Tubes, such as the types used in pipelines and flow tubes, are often affixed to one another or to other structures by welding, brazing, or other well known techniques. The affixing of tubes to other tubes or structures normally requires prior fabrication of the ends of the tubes in order to form a fluid-tight and secure joint. This fabrication process is commonly referred to as "preparation" or "finishing" of the tube end. For purposes of this patent, this process will be referred to as "preparation". Preparation includes cutting the tube ends to length and then trimming the tube ends to a specific angle, such as an angle perpendicular to the longitudinal axis of the tube. This is often followed by the beveling of the edges of the tube ends. The preparation process allows the tubes to be precisely fitted relative to the structure on which the tubes are to be affixed. The edge beveling creates a groove for a weld or brazing fillet.

Previously, tube ends were finished either individually by cutting and grinding each tube end with the use of hand tools or by using a tube end preparation apparatus. The individual cutting and grinding of the tube ends with hand tools is relatively slow and imprecise. It is near impossible to repeat this operation with precision without frequent measurements. Since this process is performed individually by hand, each tube end is formed somewhat dissimilar to other tube ends. While in some circumstances this may be acceptable, it is not acceptable in situations where precision, repeatability and speed are critical factors.

The use of tube end preparation apparatus is well known. The prior devices normally clamp onto the end of a tube. A rotating cutting head is then moved longitudinally toward the tube end, either by hand or by a hydraulic process. These devices are normally used as bench-mounted apparatus or as portable devices for use in the field for installation or repair of pipelines. Precise trimming of the tube ends to length with repeatability is practically impossible with these devices. Normally these devices are used to form a tube end approximately to length. Precision is not a concern, nor is speed.

These prior art devices also typically used either abrasive cutting disks or single point cutting tips. Both of these cutting tools require resetting and adjustment of the device whenever the cutting tools become dull or are resharpened. This further adds to the inaccuracy and time of the cutting process.

There is no known device at present that can prepare the ends of tubes repeatedly with precision. Additionally, in certain applications, the configuration of the tubes can create more difficulty in preparing the tube ends. For instance, Coriolis effect mass fluid flow meters, such as the type disclosed in U.S. Pat. No. 4,252,028, assigned to Micro Motion, Inc., Boulder, Colo., utilize flow measurement tubes which have a double bend to form a substantially "U" shape. Other types of these mass flow meters have even more complicated configurations. These tubes require critical dimensions in order to function accurately. These critical dimensions of the flow tubes include referencing the end of the tubes with respect to the nominal center of the radius of the bend of the tubes. Each end of these tubes must be finished substantially identically and symmetrically to each other to ensure proper operation of the flow meter. Tube ends formed outside these critical dimensions can greatly affect the accuracy of the measurement of these devices.

These flow tubes are normally cut to approximate length during production. The flow tubes are then bent to the correct configuration on production pipe bending apparatus. Both of these processes create variations in the flow tube configuration that are normally outside the precise tolerances required for the finished product. The cost and time to correct each of these tubes within acceptable precise tolerances add to the expense of the meters. The end preparation for these tubes must compensate for these variations. Additionally, each end of the bent flow tubes must be symmetrically finished with respect to one another. Since the prior devices and processes are unable to adequately finish the ends of these flow tubes with precision and speed, the production of these flow meters is limited.

Thus, a problem exists in that the prior art devices and processes are unable to accurately prepare the ends of these flow tubes with precision and repetition. The present invention provides a tube end preparation apparatus and process that is able to accurately, precisely and repeatedly prepare the ends of bent flow tubes to solve this problem as well as others.

SUMMARY OF THE INVENTION

The present invention solves the problem of high-speed production of precisely prepared ends of tubes. In one embodiment of the present invention, the tube end preparing apparatus is able to precisely and repeatedly prepare the ends of bent flow tubes symmetrically with the opposing flow tube ends.

The tube end preparing apparatus of this embodiment includes a reference mechanism, a tube clamping mechanism, a cutting mechanism, and cutting head control mechanisms. Each of these mechanisms includes novel and inventive features as is fully described below.

The reference mechanism and tube clamping mechanism combine to precisely locate a flow tube with respect to defined reference indicia. A first set of reference indicia are defined by the nominal centers of radius of the bent flow tube and the desired plane of the prepared flow tube end. A second set of reference indicia is defined by the longitudinal axis of the cutting mechanism.

The reference mechanism includes a fence having a side alignment surface and a bottom alignment surface. A flow tube is mounted on the fence relative to the cutting mechanism with the intermediate portion of the flow tube against the side alignment surface and the bottom alignment surface on the fence. The clamping mechanism includes a collet chuck mounted adjacent the fence. A lever on the collet chuck includes adjustable stops to limit the rotation of lever to ensure proper alignment of the flow tubes.

A bushing having an offset diamond-shaped passageway is inserted in the collet chuck passageway. One end of the flow tube is inserted through this passageway to seat against adjacent side walls of the passageway so that the flow tube is aligned with the axis of rotation of the cutting head. An intermediate portion of the flow tube engages the side alignment surface and the bottom alignment surface of the fence. The lever is then rotated clockwise until the adjustable stop abuts the lower surface of the collet chuck to clamp the flow tube. This ensures that flow tube is properly aligned. The entire locating and clamping process not only provides accuracy and symmetry in aligning and clamping the flow tube relative to the desired reference points. It also permits the clamping process to be accurately repeated with speed.

The cutting mechanism includes a rotating cutting head mounted for longitudinal movement on a carriage. The cutting head includes two cartridges which are adjustable relative to the cutting head and to the flow tube. Indexable cutting inserts are mounted in each of the two cartridges. One of the cutting inserts cuts the tube to length while the other cutting insert bevels the outside diameter of the tube.

A pneumatic diaphragm is pressurized to move the carriage longitudinally. A first closed-loop hydraulic control system controls the longitudinal movement of the carriage during the traverse of the carriage prior to the actual cutting operation and after the cutting operation. This first closed-loop system can be adjusted to control the rate of movement of the carriage.

A first stop mechanism causes a plunger to contact a micro-switch to stop the longitudinal movement of the carriage. A second stop uses a hard stop to prevent the carriage from overtravel due to momentum. The air pressure is released in the pneumatic diaphragm to allow springs to return the carriage to its initial position.

A second adjustable closed-loop hydraulic control system controls the feeding movement of the carriage as the cutting head nears the end of the flow tube. The carriage engages a plunger on a hydraulic cylinder mounted on the base support. The plunger slides in the hydraulic cylinder against the resistance of the hydraulic fluid in the hydraulic cylinder to provide a controlled feeding rate of the cutting head during the cutting operation.

The invention is further described in the following detailed description of one possible preferred exemplary embodiment and in the drawings to provide an exemplary example of the features of the present invention.

DETAILED DESCRIPTION OF A PREFERRED EMBODIMENT

The present invention provides an apparatus and process for preparing the ends of tubes, particularly bent flow tubes, for affixing onto a structure or tube. In terms of this invention, "preparing" and "preparation" refers to the precise cutting to length of the tube and the cutting of the tube end in a desired plane and angle, such as perpendicular to the longitudinal axis of the tube. This process can also include the cutting of an outer bevel on the tube end. A preferred embodiment of the present invention is illustrated in FIGS. 2-10 and described in detail below. This particular embodiment is a bench-type apparatus for preparing the ends of bent flow tubes of the type used in Coriolis effect mass fluid flow meters. It is to be expressly understood that this exemplary embodiment is for explanatory purposes only and is not meant to limit the scope of the inventive concept.

Figures 1, 5:
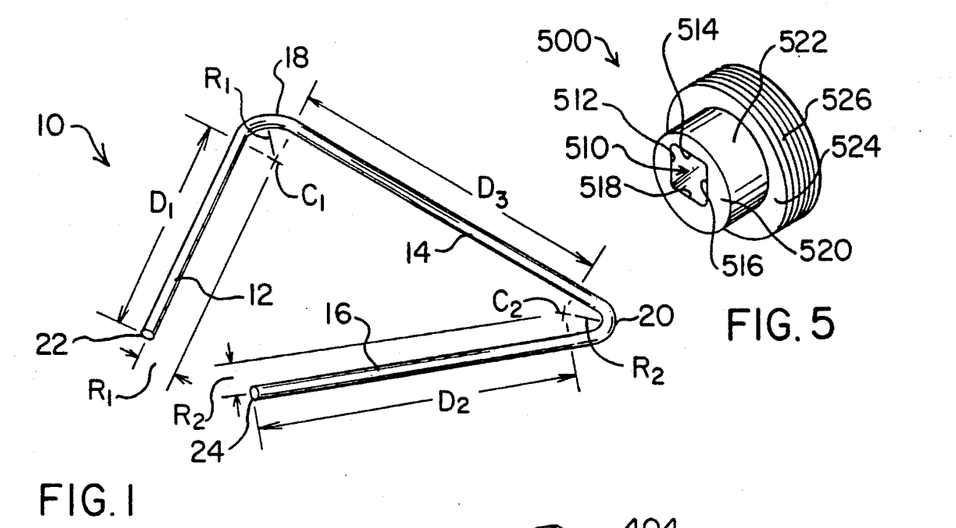
FIG. 1 shows a perspective view of a prior art flow tube for a Coriolis effect mass fluid flow meter.
FIG. 5 shows a perspective view of the locating bushing of the clamping mechanism of FIG. 5.

A typical flow tube used in Coriolis effect mass fluid flow meters is illustrated in FIG. 1. Flow tube 10 typically has an outer diameter ranging from ⅛ inch to about 2 inches. Flow tube 10 is cut to an approximate length and then bent on production pipe bending apparatus. Flow tube 10 thus has a first portion 12 having a length $D_1$ measured from tube end 22 to center of bend radius $C_1$, a second portion 16 having a length $D_2$ measured from tube end 24 to center of bend radius $C_2$, and an intermediate portion 14 having a length $D_3$ between the centers of bend radius $C_1$, $C_2$. Bend 18 between first portion 12 and intermediate portion 14 has a nominal radius $R_1$ from center $C_1$. Bend 20, between intermediate portion 14 and second portion 16, has a nominal radius $R_2$ from center $C_2$. It is critical for proper operation of a Coriolis effect mass flow meter that ends 22, 24 of flow tube 10 be symmetrically prepared with respect to lengths $D_1$, $D_2$ and to radii $R_1$, $R_2$; and that the plane of ends 22, 24 be symmetrical with respect to intermediate tube portion 14. Failure to maintain these critical dimensions and configurations can result in inaccuracies in the operation of the Coriolis effect mass fluid flow meters. It is to be expressly understood that the present invention is not meant to be limited to operation with this workpiece configuration. The scope of the inventive concept of the present invention has application to other sizes and configurations of workpieces.

Figure 2:
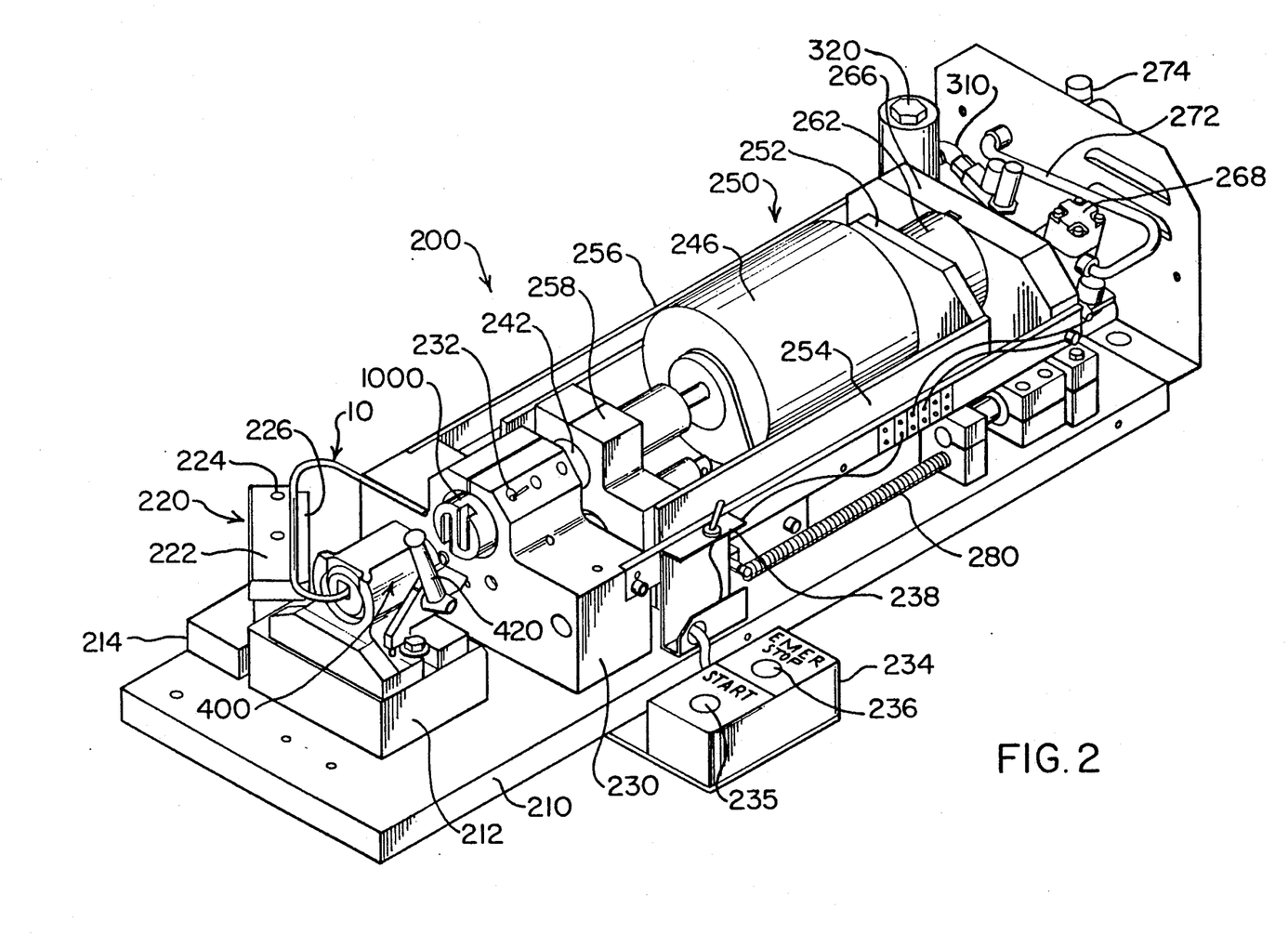
FIG. 2 shows a perspective view of one possible preferred embodiment of the present invention.

One possible preferred embodiment is illustrated in FIGS. 2-10. Tube end preparing apparatus 200, shown in perspective in FIG. 2, is mountable on a bench for preparing tube ends having diameters up to about two inches. It is to be expressly understood that other embodiments of the present invention are covered under the inventive concept for other configurations and sizes of apparatus.

Tube end preparing apparatus 200 includes reference mechanism 220, tube clamping mechanism 400, cutting mechanism 1000, and cutting head control mechanisms 700, 800, 900. Reference mechanism 220 and tube clamping mechanism 400 combine to precisely locate a flow tube with respect to defined reference indicia. A first set of reference indicia are defined by the nominal centers of radius of the bent flow tube and the desired plane of the prepared flow tube end. A second set of reference indicia is defined by the longitudinal axis of the cutting mechanism 1000.

Figure 9:
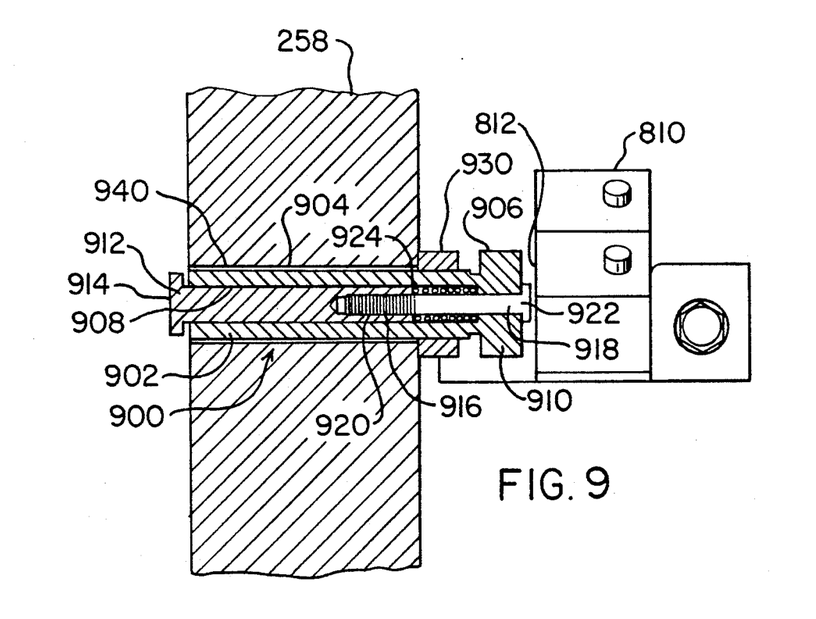
FIG. 9 shows a detail cutaway view of the plunger mechanism of the stop mechanism of FIG. 8.
Figure 10:
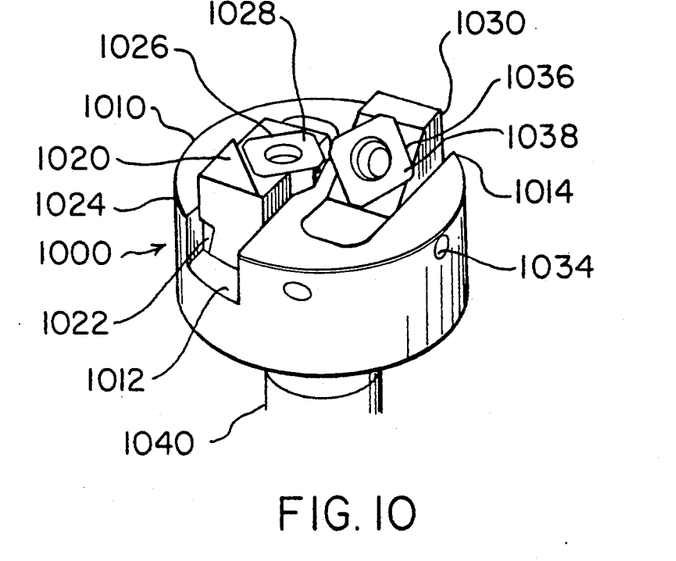
FIG. 10 shows a perspective view of the cutting head of the embodiment of FIG. 2.

Cutting mechanism 1000, shown in detail in FIG. 10, includes a rotating cutting head with cutters installed thereon. The cutting head control mechanisms, shown in FIGS. 7, 8 and 9, include a pneumatic diaphragm to move the rotating cutting head along its longitudinal axis, closed-loop hydraulic mechanisms to control the rate of the longitudinal movement of the carriage and the feed-rate control of the cutting operation, a stop mechanism to limit the extent of longitudinal movement of the rotating cutting head and a return mechanism to return the rotating cutting head to its original position. Each of these mechanisms includes novel and inventive features as fully described below.

REFERENCE MECHANISM

Figure 3:
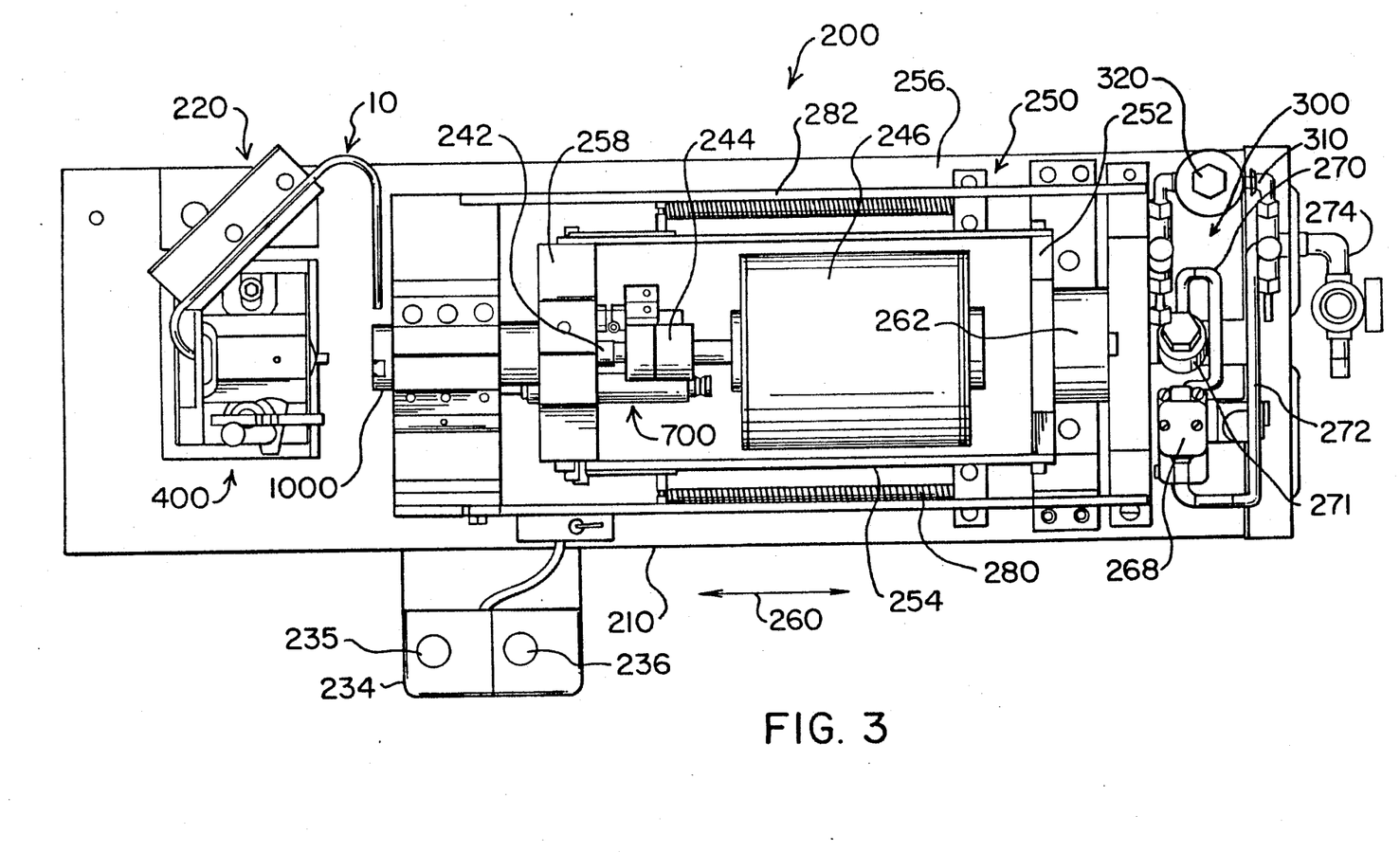
FIG. 3 shows a top view of the embodiment of FIG. 2.

Tube preparing apparatus 200 as shown in FIGS. 2 and 3 includes base portion 210 which is mountable onto a bench or stand (not shown). Reference mechanism 220 is secured onto support 214 on base portion 210. Reference mechanism 220 includes fence 222 having side alignment surface 224 and bottom alignment surface 226. Flow tube 10 is mounted on fence 220 relative to cutting head mechanism 1000 with intermediate tube portion 14 against side alignment surface 224 and bottom alignment surface 226 on fence 222.

CLAMPING MECHANISM

Figure 4:
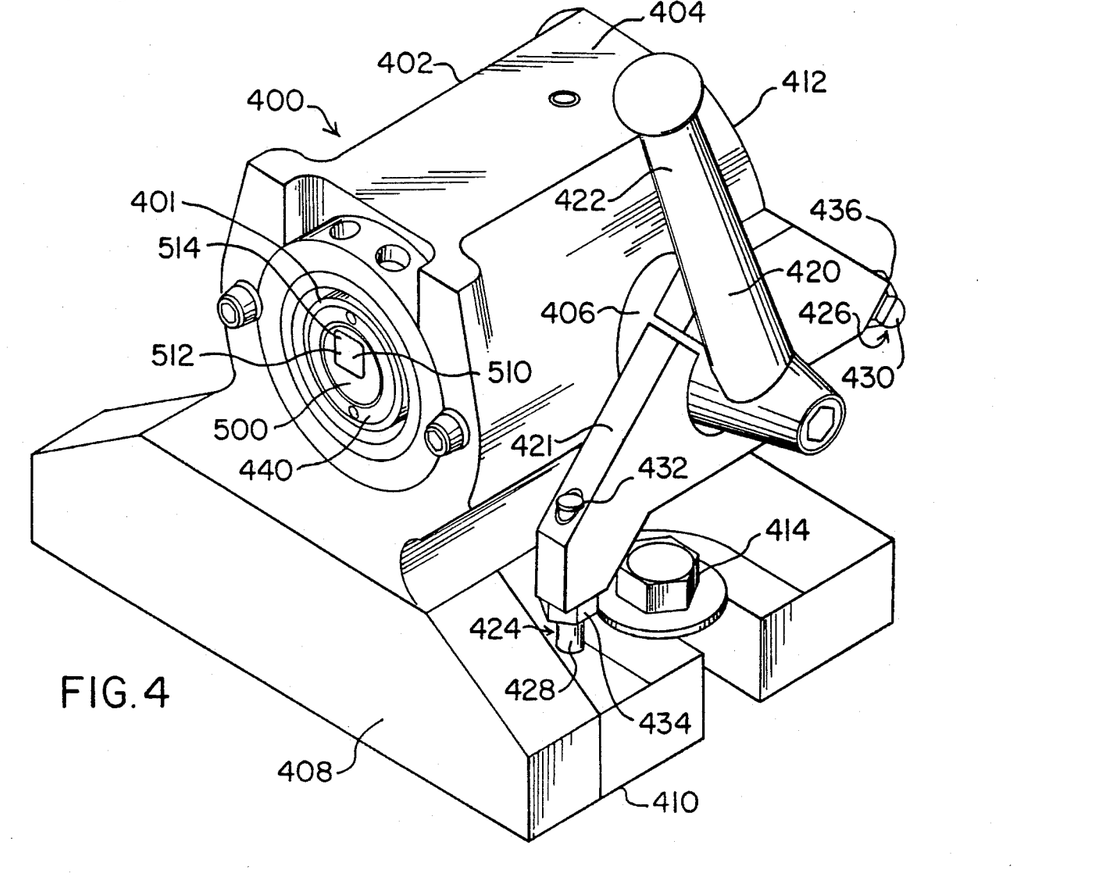
FIG. 4 shows a perspective view of a clamping mechanism of the embodiment of FIG. 2.

Clamping mechanism 400, shown in FIGS. 2 and 3, is mounted on support 212 on base portion 210. Clamping mechanism 400 includes collet chuck 402 shown in detail in FIG. 4. Collet chuck 402 is similar to collet chucks well known in the art. This style of collet chuck includes body portion 404 having base 408 with bottom alignment surface 410 for mounting on base structure 212. Collet chuck 402 includes a central passage (not shown) into which a resiliently compressible collet 401, shown in FIG. 4, is inserted to extend in front surface 412 of collet chuck 402. A cam (not shown) is mounted in the interior of collet chuck 402 which compresses collet 401 to clamp the workpiece. Lever 420 is rotatable about axis 406 to actuate the cam to clamp and unclamp collet 401. Lever 420 includes handle portion 422.

Clamping mechanism 400 includes unique features to cooperate with reference fence 222 to align the flow tube workpieces with respect to the defined reference indicia. Tube 10 is aligned by clamping mechanism 400, as discussed below, by the front of collet 401 and the rear of collet 401 to be coaxial with the axis of rotation of cutting head 1010 (FIG. 10). If lever 420 is not returned to the exact position to open collet 401, the alignment of the flow tube in collet 401 will differ each time. Also, if lever 420 is over-rotated, collet 401 may compress the flow tube. Lever 420 is fixably attached to element 421 which includes adjustable stops 424, 426 to limit the rotation of lever 420 to ensure proper alignment of the flow tubes. Adjustable stop 424 includes threaded stud 428 which engages threaded hole 432 in lever 420. Lock nut 434 is tightened against lever 420 to prevent accidental movement of threaded stud 428. Adjustable stop 426 operates in a similar fashion. Threaded stud 430 engages a threaded hole (not shown) in lever 420. Lock nut 436 is tightened against lever 420 to prevent accidental movement of threaded stud 430. Thus, lever 420 is able to precisely open and close the collet.

Another unique feature of clamping mechanism 400 includes locating bushing 500, which is shown in detail in FIG. 5. Diamond or quadrilaterally shaped passage 510 extends longitudinally through locating bushing 500. Passage 510 includes adjoining side walls 512, 514, 516, 518. Passage 510 is offset from the center of locating bushing 500 as discussed more fully below. Locating bushing 500 includes end surface 520 and reduced diametrical portion 522. Surface 524 extends perpendicularly from reduced diametrical portion 522 at a mid region of locating bushing 500. Threaded surface 526 extends from surface 524 to the opposing end surface (not shown) of locating bushing 500.

Locating bushing 500 is mounted in the rear region of the central passage of collet 401, as shown in FIG. 4. Threaded surface 526 engages a threaded portion (not shown) within collet 401. Locating bushing 500 is rotated until passage 510 is offset relative to the longitudinal axis of collet 401 in collet chuck 402. Clamping ring 440, shown in FIG. 4, engages over reduced portion 522 and against surface 524 by engaging a threaded surface (not shown) on collet 401. This prevents accidental movement of locating bushing 500 once locating bushing 500 is precisely aligned.

FLOW TUBE ALIGNMENT

Figure 6:
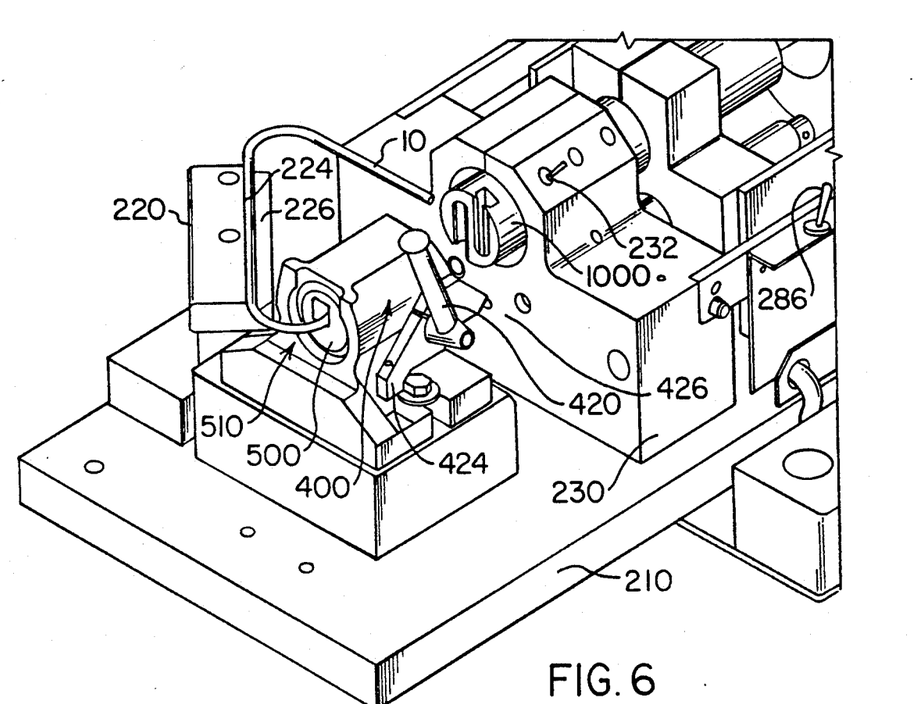
FIG. 6 shows a rear perspective view of a flow tube clamped in the clamping mechanism of the embodiment of FIG. 2.

Locating bushing 500 and clamping lever 420 provide the additional reference indicia to ensure proper alignment of flow tube 10. As shown in FIG. 6, one of either first portion 12 or second portion 16 is inserted through passage 510 of locating bushing 500. This flow tube portion is seated against adjacent side walls 516, 518 of passage 510 to be aligned with the axis of rotation of cutting head 1000, discussed below. Intermediate portion 14 engages side alignment surface 224 and bottom alignment surface 226 of fence 220. Lever 420 is then rotated clockwise until adjustable stop 426 abuts the lower surface of collet chuck 402 to clamp flow tube 10 relative to fence 220 and locating bushing 500. This ensures that flow tube is properly aligned. The entire locating and clamping process not only provides accuracy and symmetry in aligning and clamping the flow tube relative to the desired reference indicia, it also can be accurately repeated with speed. The other portion of flow tube 10 can then be easily inserted to be symmetrical to the previously prepared tube end. The end surfaces 22, 24 will be located relative to cutting head 1010 to prepare the tube ends within the necessary tolerances.

CUTTING MECHANISM

Cutting mechanism 1000 includes cutting head 1010, shown in detail in FIG. 10. Cutting head 1010 includes two parallel and offset slots 1012, 1014. Facing cartridge 1020, and bevel cartridge 1030 are slidably mounted within slots 1012, 1014, respectively. Cartridge 1020, includes an angular gib 1022. The angular gib for cartridge 1030 is not shown. Set screws (not shown) threadingly engage in holes 1024, 1034 to engage gib 1022 and a gib not shown to clamp each of cartridges 1020, 1030 in slots 1012, 1014. Facing cartridge 1020 includes insert pocket 1026 set substantially flat with slight angle to receive indexable carbide cutting insert 1028. Bevel cartridge 1030 includes insert pocket 1036 at a substantially forty-five degree angle to receive indexable cutting insert 1038.

Cartridges 1020, 1030 are easily adjusted to the desired cutting diameters by sliding within slots 1012, 1014. Set screws clamp gibs 1022, 1032 once cartridges 1020, 1030 have been adjusted. Cutting inserts 1028, 1038 are accurately indexed when necessary to maintain the accuracy of the cutting operation without requiring resetting of cartridges 1020, 1030. This is a marked improvement over the prior art apparatus using single point tools.

Figure 7:
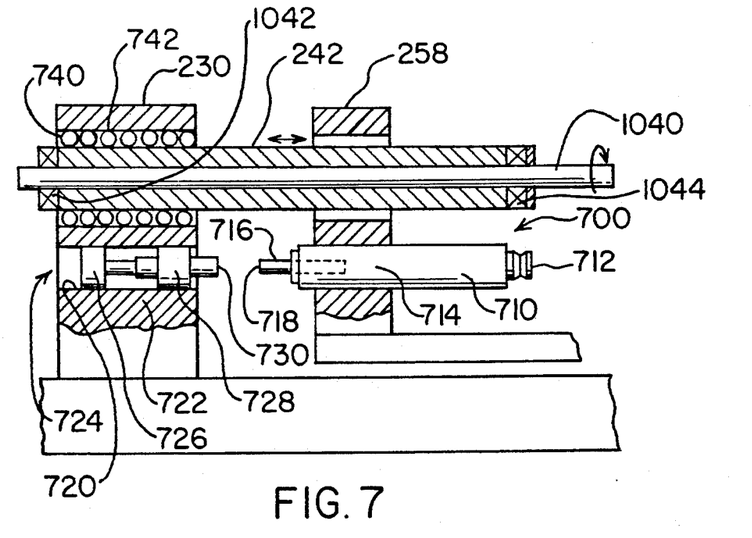
FIG. 7 shows a detail cutaway view of the feed control mechanism of the embodiment of FIG. 2.

Cutting head 1010 is affixed onto rotatable drive shaft 1040. Drive shaft 1040, shown in FIG. 7, extends through quill 242 which is supported on headstock 230 secured onto base 210, as shown in FIGS. 2 and 3. Drive shaft 1040, shown in FIG. 7, is mounted for rotational movement relative to quill 242 on bearings 1042, 1044, shown in FIG. 7. Quill 242 is supported on headstock 230 for longitudinal movement relative to headstock 230 by bearings 740. Quill 242 is also supported on carriage support 258 for movement with carriage 250.

Spindle lock 232, shown in FIG. 6, engages drive shaft 1040, when necessary, to lock drive shaft 1040 from rotation. This is desirable when the cutting tips of cutting head 1010 are indexed or changed. Head stock 230 (FIG. 2) and carriage support 258 provide support and alignment for quill 242 to keep drive shaft 1040 in precise alignment during the cutting process.

Drive motor 246 is secured to drive shaft 1040 by flexible coupling 244 shown in FIG. 3. Flexible coupling 244 minimizes misalignment of drive shaft 1040. Drive motor 246 is an electric motor well-known in the art. Drive motor 246, carriage support 258 and quill 242 are mounted for longitudinal movement on carriage 250, as shown in FIGS. 2 and 3. Switch 234, shown in FIG. 2, includes start button 235 to start the operation of drive motor 246 as well as the control mechanism discussed below. Emergency stop button 236 is included to immediately stop drive motor 246 and the control mechanism in emergency situations. Switch 238, shown in FIG. 2, is used to actuate the control mechanism, discussed below, without actuating drive motor 246. This allows for adjustment of the control mechanism.

CUTTING HEAD CONTROL MECHANISM

Carriage 250 includes rear wall 252 with side rails 254, 256 secured to carriage support 258. Carriage 250 provides movement along a longitudinal axis parallel to the axis of rotation of cutting head 1010 as indicated by arrow 260 in FIG. 3. Pneumatic diaphragm 262 is secured between carriage rear wall 252 and base support structure 266. Pneumatic diaphragm 262 is actuated by air supplied through pneumatic valves 268, 271. Pneumatic valve 268 provides a "soft start" to pneumatic diaphragm. The air is provided in two stages to pneumatic diaphragm 262. The first stage is a lower air pressure for a predetermined time interval. After the expiration of the predetermined time interval, the air is provided during a second stage at a higher air pressure. This provides a soft start for the movement of carriage 250. Air is supplied to valves 268, 271 through conduit 272 and 270 from regulator 274. An external air supply is connected to regulator 274. Outlet valve 271, discussed below, is provided to release the air pressure from pneumatic diaphragm 262.

Control mechanism 300 (FIGS. 2 and 3) controls the longitudinal movement of carriage 250 during the traverse of carriage prior to the cutting operation and after the cutting operation. Control mechanism 300 includes a closed-loop hydraulic loop 310 (FIG. 3) connected to the rear of carriage 250. A plunger (not shown) is connected to the rear of carriage 250 to slide against pressure within closed-loop 310. Adjustment knobs 320 and 321 provide adjustment to the resistance of closed-loop 310 to allow faster or slower traverse of carriage 250.

Control mechanism 700, shown in FIGS. 3 and 7, controls the longitudinal movement of carriage 250 during the cutting process. Control mechanism 700, shown in detail in FIG. 7, includes a closed-loop hydraulic device. Hydraulic cylinder 710 is secured to base support 258. Adjustment knob 712 controls the pressure of hydraulic fluid within reservoir 714 of hydraulic cylinder 710. Typically, silicon is used as the hydraulic fluid in hydraulic cylinder 710. Plunger 716 is slidable within reservoir 714 under pressure from the hydraulic fluid therein. End surface 718 of plunger 716 engages adjustable stop 724 as cutting head 1010 nears the end of the flow tube workpiece to be prepared.

Adjustable stop 724 includes head portion 726 having a tool engageable surface. Threaded portion 728 engages threaded portion 722 of head stock 230. End surface 730 engages end surface 718 of plunger 716 to control the rate of movement of carriage 250 by the movement of plunger 716 against the pressure within reservoir 714 of cylinder 710. Adjustable stop 724 is adjusted relative to head stock 230 by rotation from a tool engaging tool engageable surface of head portion 726. The engagement of plunger 716 with stop 724 is timed to occur as the air is provided to pneumatic diaphragm 262 at the second higher pressure stage.

CARRIAGE STOP AND RETURN MECHANISM

The movement of carriage 250, as shown in FIG. 3, includes stop mechanism 800 to limit the movement of cutting head 1010 once the end of the flow tube workpiece is precisely prepared. Stop mechanism 800, shown in detail in FIGS. 8 and 9, includes micro-switch 810 having spring switch 812 mounted on carriage 250. Spring switch 812, as is well-known in the art, actuates the air release from pneumatic valve 271 upon contact with end stop 900. This releases the air pressure within pneumatic diaphragm 262 to stop the forward movement of carriage 250 and allow carriage 250 to return to its original position.

End stop 900 includes stud 902 having a threaded surface engaging a threaded surface in cavity 904 of carriage support 258. Stud 902 includes head portion 906 and inner cavity 908. Plunger 912 is slidable within inner cavity 908 of stud 902. Head portion 914 on plunger 912 forms a hard stop as discussed below. Bolt 918 includes threaded portion 920 engaging a threaded portion in cavity 916 of plunger 912. Head portion 922 of bolt 918 prevents plunger 912 from exiting cavity 908 of stud 902. Spring 924 resiliently biases plunger 912 outwardly from stud 902. This provides stop mechanism 900 with a first stop method. The initial stop is from the actuation of micro-switch 810 by engagement with bolt head portion 922.

Stop mechanism 900 also includes a hard stop from the engagement of plunger 912 with end stop 820, discussed below, on head stock 230 to ensure that cutting head 1010 will not overtravel and undercut the flow tube workpiece.

Figure 8:
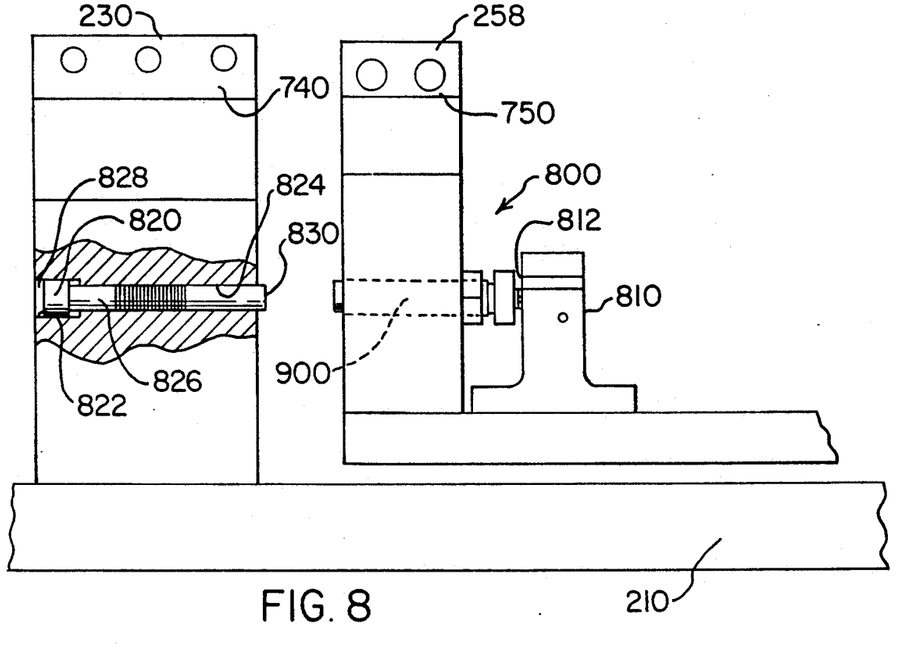
FIG. 8 shows a detail cutaway view of the stop mechanism of the embodiment of FIG. 2.

Head stock 230 includes adjustable end stop 820 mounted in cavity 822. Adjustable end stop 820 includes a head portion inserted in enlarged cavity portion 828 of cavity 822. Threaded portion 826 engages threaded portion 824 of cavity 822. End surface 830 provides a stopping surface for engagement with plunger 912.

In operation, as cutting head 1010 prepares the end surface of the flow tube workpiece, end surface 914 of plunger 912 engages end stop surface 830. Plunger 912 slides against the pressure from spring 924 so that bolt head portion 922 engages spring switch 812. Spring switch 812 forms a contact in micro-switch 810 to actuate the release of the air pressure in pneumatic diaphragm 262 to stop the forward motion of carriage 250. In order to stop any further momentum of carriage 250, head portion 914 of plunger 912 engages the end surface of stud 902 in a hard stop. The displacement of plunger 912 relative to stud 902 after bolt head surface contacts spring switch 812 can be adjusted by bolt 918 to compensate for any discrepancy in the movement of spring switch 812.

Once the air pressure has been released in pneumatic diaphragm 262, springs 280, 282, shown in FIGS. 2 and 3, mounted on the sides of carriage 250 return carriage 250 to its original position. A time delay can be incorporated in micro-switch 810 or in pneumatic valve 271 to cause cutting head 1010 to rotate in place for a period long enough to finish the final cutting operation. Additionally, pneumatic valve 271 can gradually release the air pressure in pneumatic diaphragm 262 to return carriage 250 in a controlled motion.

OPERATION OF THE APPARATUS

In operation, tube preparation apparatus is able to prepare the ends of tubes at a high rate, with precision and with repetition. A tube, such as flow tube 10 is mounted in the apparatus by inserting tube portion 12 or tube portion 16 through passage 510 of locating bushing 500 in collet 401. This flow tube portion is seated against adjacent side walls 516, 518 of passage 510 to be aligned with the axis of rotation of cutting head 1010. Intermediate flow tube portion 14 engages side alignment surface 224 and bottom alignment surface 226 of fence 220. Lever 420 of collet chuck 402 is then rotated clockwise to clamp flow tube 10 relative to fence 220 and locating bushing 500. This ensures that the flow tube is properly aligned. The entire locating and clamping process not only provides accuracy and symmetry as to locating the flow tube relative to the desired reference indicia but can be accurately repeated time after time. The other flow tube portion can be easily inserted to be symmetrical to the prepared portion. The flow tube end surfaces 22, 24 will be in proper alignment relative to cutting head 1010 well within the necessary tolerances.

Cartridges 1020, 1030 can be adjusted for the precise cutting diameters for the size of tube chosen. Additionally, cutting inserts 1028, 1038 can be indexed if needed.

Initially, and periodically thereafter, the control mechanisms 700, 800 and 900 may need to be adjusted. This is accomplished by using switch 238, shown in FIG. 2. This switch causes air valves 268, 271 to fill pneumatic diaphragm 262 without turning on drive motor 246. Hydraulic control 700 can be adjusted by adjustment knob 712 to control the pressure in hydraulic cylinder 710. Also, the position of end stop surface 730 can be adjusted by rotation of end stop head portion 726. This will adjust the point wherein carriage 250 will be slowed to precisely feed cutting head 1010 into the end of the flow tube workpiece.

The stop mechanisms 800, 900 can be adjusted at this time as well. The hard stop engagement is preset to trip the micro-switch 810 before the hard stop bottoms out. The engagement of bolt end surface 922 with spring switch 812 can be adjusted by rotating stud 902 in cavity 940. This adjustment is performed to ensure that the flow tube ends are within the proper tolerances.

Once the adjustments are corrected, then the apparatus can be actuated by pushing start button 235 on switch 234, shown in FIG. 2. Drive motor 246 is turned on and air valves 268 initially pressurizes pneumatic diaphragm 262 to move carriage 250 longitudinally. After an initial time period, air valve 268 pressurizes pneumatic diaphragm 262 at a higher level to move carriage 250 at a faster rate. As cutting head 1010 nears the flow tube end, plunger 718 contacts end stop surface 730 to precisely control the movement of carriage 250 during the cutting process.

Once cutting head 1010 reaches the desired depth of cut on the flow tube end, bolt head surface 922 pushes against spring switch 812 to activate air valve 271 to release the pressure in pneumatic diaphragm 262. A time delay can be used to ensure that cutting head 1010 finishes the desired cut at this depth on lower speed machines. Plunger head 914 engages the end surface of stud 902 to cause a hard stop to compensate for any variation or discrepancy in micro-switch 810.

Springs 280, 282 will return carriage 250 to its original position once the pressure in pneumatic diaphragm 262 is released. Drive motor 246 automatically turns off at this point as well. Lever 420 can be rotated counter-clockwise at this time to allow the workpiece to be removed and the opposing portion or new workpiece inserted.

Additional safety features for this apparatus which are not shown in the drawings include safety shields over the cutting head and workpiece during the preparing operation. A safety interlock switch can be used to prevent operation of the apparatus unless the safety shield is in place.

The present invention includes several unique features to provide an apparatus and process that can prepare the ends of tubes, particular specially configured flow tubes, with precision, speed and repetition. It is again repeated that this description of a preferred embodiment is intended for descriptive purposes and is not meant to limit the scope of the inventive concept.

I claim:

1. A process for precision preparation of the ends of a bent tube, said process comprising the steps of:
   (a) providing apparatus having a rotating cutting head linearly movable along a longitudinal axis defined by the axis of rotation of said rotating cutting head;
   (b) providing first reference indicia on said apparatus defined by a nominal center of radius of said bent tube and a plane of the desired prepared end of said bent tube mounted in said apparatus;
   (c) providing second reference indicia on said apparatus defined by said longitudinal axis;
   (d) providing means for precisely locating and clamping said bent tube with respect to said first reference indicia, said second reference indicia and said rotating cutting head;
   (e) providing means for infeeding said rotating cutting head along said longitudinal axis to cut the end of said clamped bent tube; and
   (f) providing means for precisely stopping said infeeding means when said rotating cutting head has reached said plane of the desired prepared end of said bent tube.

2. The process of claim 1 wherein said step of providing means for precisely stopping said infeeding means further includes the step of:

providing a hard stop for engaging and stopping said means for infeeding said rotating cutting head along said longitudinal axis.

3. The process of claim 1 wherein said step of providing means for precisely stopping said infeeding means further includes the steps of:

providing switch means for stopping said means for infeeding said rotating cutting head along said longitudinal axis; and providing a plunger for actuating said switch means as said rotating cutting head reaches said plane of the desired prepared end of said bent tube.

4. The process of claim 3 wherein said step of providing means for precisely stopping said infeeding means further includes the steps of:

providing a hard stop adjacent said plunger so that said plunger also contacts said hard stop as said rotating cutting head reaches said plane of the desired prepared end of said bent tube.

5. The process of claim 1 wherein said step of providing means for infeeding said rotating cutting head along said longitudinal axis further includes the steps of:

providing a carriage on which said rotating cutting head is mounted;

providing a pneumatic diaphragm affixed to said carriage; and providing an air supply for actuating said pneumatic diaphragm to move said carriage and said rotating cutting head along said longitudinal axis.

6. The process of claim 5 wherein said step of providing an air supply further includes the step of:

providing valve means for allowing air at a first pressure level during an initial time interval into said pneumatic diaphragm and for allowing air at a second pressure level after said initial time interval.

7. The process of claim 1 wherein said process further comprises the step of:

providing means for returning said rotating cutting head to its initial starting point after said rotating cutting head has reached said plane of the desired prepared end of said bent tube.

8. The process of claim 7 wherein said steps of providing said means for returning said rotating cutting head includes the step of:

providing closed-loop hydraulic means for controlling the rate of return of said rotating cutting head.

9. The process of claim 7 wherein said steps of providing said means for returning said rotating cutting head includes the step of:

providing a time delay for delaying the return of said rotating cutting head when said rotating cutting head reaches said plane for a predetermined time interval.

10. The process of claim 7 wherein said means for returning said rotating cutting head includes the step of:

providing spring means for returning said rotating cutting head to its initial starting point.

11. The process of claim 1 wherein said step of providing means for infeeding said rotating cutting head along said longitudinal axis includes the steps of:

providing a longitudinally moving carriage on which said rotating cutting head is mounted;

providing a hydraulic cylinder mounted on said carriage; and providing a plunger mounted within said hydraulic cylinder which contacts a surface fixed relative to said carriage as said rotating cutting head cuts said bent tube to control the rate of movement of said carriage.

12. The process of claim 1 wherein said step of providing second reference indicia includes the step of:

providing an angularly-shaped hole on said clamping means for centering the bent tube against adjacent surfaces of said angularly-shaped hole as said clamping means clamp the bent tube.

13. The process of claim 1 wherein said step of providing means for precisely locating and clamping the bent tube includes the step of:

providing a collet chuck for clamping the bent tube.

14. The process of claim 13 wherein said step of providing means for precisely locating and clamping the bent tube further includes the step of:

providing means on said collet chuck to limit the pressure on the bent tube to assure constant clamping pressure.

15. The process of claim 1 wherein said step of providing apparatus having a rotating cutting head further includes the steps of:

providing adjustable cartridges on said rotating cutting head with indexable cutting inserts; and adjusting said adjustable cartridges and said cutting inserts for precisely cutting said ends of said bent tube.

16. A process for precisely and repeatedly preparing the ends of bent tubes, said process comprises the steps of:

(a) mounting a bent tube against first reference indicia defined by the nominal center of radius of the bend of the bent tube and the plane of the desired prepared end of said bent tube;

(b) mounting said bent tube against second reference indicia defined by a longitudinal axis perpendicular to said plane of the desired prepared end of said bent tube;

(c) clamping said bent tube precisely in reference with said first reference surface and said second reference indicia; and (d) cutting the end of said bent tube with a rotating cutting head until said rotating cutting head reaches said plane of the desired prepared end of said bent tube.

17. The process of claim 16 wherein said step of cutting the end of said bent tube further includes the steps of:

moving said rotating cutting head on a carriage along a longitudinal axis; and contacting a plunger against a switch as said rotating cutting head reaches said plane of the desired prepared end of said bent tube to stop said longitudinal movement of said rotating cutting head.

18. The process of claim 17 wherein said step of:

contacting said plunger against said switch further includes the steps of:

contacting said plunger against a hard stop to completely stop the longitudinal movement of said rotating cutting head.

19. The process of claim 17 wherein said step of cutting the end of said bent tube further includes the step of:

moving said rotating cutting head in the direction away from said bent tube once said switch has stopped the said longitudinal movement of said rotating cutting head.

20. The process of claim 19 wherein said step of cutting the end of said bent tube further includes the step of:

delaying the movement of said rotating cutting head in the direction away from said bent tube for a predetermined time interval.

21. The process of claim 16 wherein step of cutting said end of said bent tube with a rotating cutting head further includes the steps of:

providing adjustable cartridges on said rotating cutting head;

providing indexable cutting inserts on said adjustable cartridges; and adjusting said cartridges and said cutting inserts to accurately cut said end of said bent tube.

22. An apparatus for repeatedly precisely preparing the end of a bent tube, said apparatus comprising:

a cutting head having at least one cutter;

means for rotating said cutting head;

means for moving said cutting head along a longitudinal axis defined by the axis of rotation of said cutting head;

means for precisely stopping said movement of said cutting head along said longitudinal axis at a predetermined point;

means for providing first reference indicia defined by the nominal center of radius of said bent tube to be prepared and said predetermined point;

means for providing second reference indicia defined by said longitudinal axis; and means for precisely clamping said bent tube to be prepared relative to said first reference indicia and said second reference indicia so that said cutting head can prepare the end of said bent tube relative to said predetermined point.

23. The apparatus of claim 22 wherein said means for stopping said longitudinal movement of said cutting head includes:

a hard stop for contacting and stopping the longitudinal movement of said cutting head when said cutting head reaches said predetermined point.

24. The apparatus of claim 22 wherein said means for moving said cutting head along a longitudinal axis includes:

a carriage on which said cutting head is mounted; and said means for stopping said longitudinal movement of said cutting head includes:

switch means for stopping said means for moving said cutting head along a longitudinal axis; and means on said carriage for actuating said switch means as said cutting head reaches said predetermined point.

25. The apparatus of claim 24 wherein said means for moving said cutting head along a longitudinal axis includes:

a carriage on which said cutting head is mounted; and said means for stopping said longitudinal movement of said cutting head includes:

a hard stop for contacting and stopping said carriage when said cutting head reaches said predetermined point.

26. The apparatus of claim 22 wherein said means for moving said cutting head along a longitudinal axis includes:

a carriage on which said cutting head is mounted;

a pneumatic diaphragm affixed to said carriage; and an air supply for actuating said pneumatic diaphragm to move said carriage and said cutting head along said longitudinal axis.

27. The apparatus of claim 26 wherein said air supply includes:

valve means for allowing air at a first pressure level during an initial time interval into said pneumatic diaphragm; and for allowing air at a second pressure level after said initial time interval.

28. The apparatus of claim 22 wherein said apparatus includes means for returning said cutting head to its initial starting point when said cutting head reaches said predetermined point.

29. The apparatus of claim 28 wherein said returning means includes:

closed-loop hydraulic means for controlling the rate of return of said cutting head.

30. The apparatus of claim 29 wherein said returning means include:

means for delaying the return of said cutting head when said cutting head reaches said predetermined point for a predetermined time interval.

31. The apparatus of claim 28 wherein said returning means includes:

spring means for returning said cutting head to its initial starting point.

32. The apparatus of claim 22 wherein said apparatus further comprises:

means for controlling the rate of longitudinal movement of said cutting head as said cutting head cuts said end of said bent tube.

33. The apparatus of claim 32 wherein said means for controlling the rate of longitudinal movement of said cutting head includes:

a carriage on which said cutting head is mounted for longitudinal movement;

a hydraulic cylinder mounted on said carriage; and a plunger mounted within said hydraulic cylinder which contacts a surface fixed relative to said carriage as said cutting head cuts said bent tube to control the rate of movement of said carriage.

34. The apparatus of claim 22 wherein said means for providing said second reference indicia includes:

an angularly-shaped hole formed on said clamping means for centering said bent tube against adjacent surfaces of said angularly-shaped hole as said clamping means clamp said bent tube.

35. The apparatus of claim 22 wherein said clamping means include a collet chuck.

36. The apparatus of claim 35 wherein said collet chuck includes means for precisely limiting the clamping pressure on said bent tube to assure constant clamping pressure.

37. The apparatus of claim 22 wherein said at least one cutter comprises:

at least one slot in said cutting head;

a cartridge in slidable mounted in said at least one slot;

means for clamping said cartridge in said at least one slot; and an indexable cutting insert mounted in said cartridge.

* * * * *